July 13, 1943.　　　　N. VALLINOS　　　　2,324,045
AIRPLANE WITH SELF OPENING PARACHUTE
Filed Aug. 8, 1940
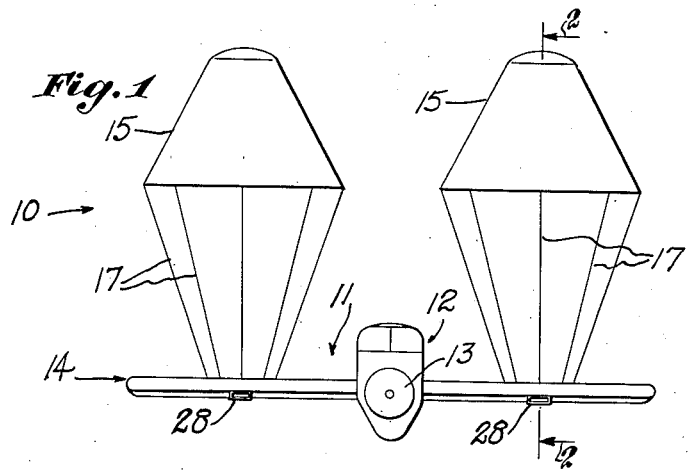
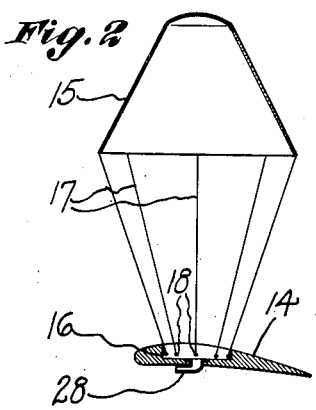
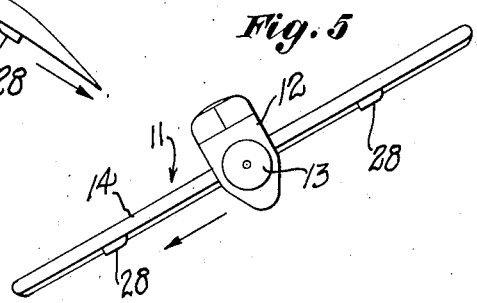
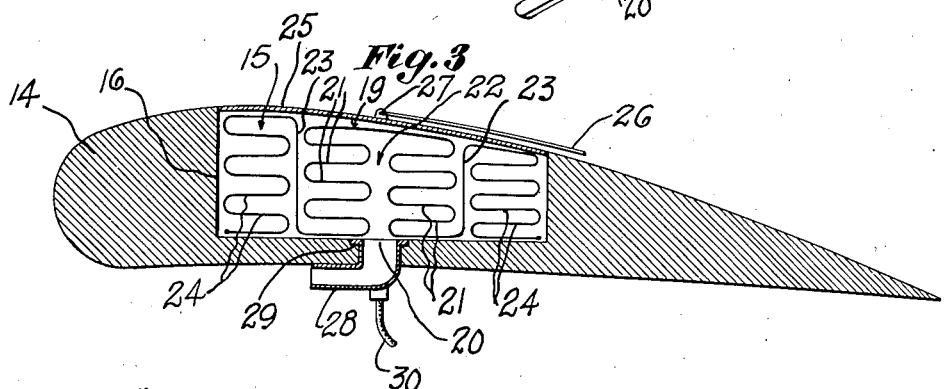
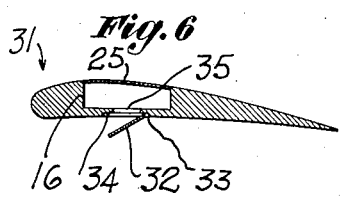
Nicholas Vallinos INVENTOR.
BY
ATTORNEY.

Patented July 13, 1943

2,324,045

UNITED STATES PATENT OFFICE 2,324,045

AIRPLANE WITH SELF-OPENING PARACHUTE

Nicholas Vallinos, New York, N. Y.

Application August 8, 1940, Serial No. 351,843

2 Claims. (Cl. 244—147)

This invention relates to safety devices for airplanes.

One object of the invention is to provide an aircraft with a self opening parachute, so constructed and arranged as not to materially diminish the stream line effect of the aircraft nor its flight efficiency.

Another object of the invention is the provision of an aircraft, such as an airplane, with a parachute that is openable in a pneumatic manner to thus obtain a completely operative position of the parachute in a minimum of time and in a wholly reliable manner.

Another object of the invention is to furnish an aircraft such as an airplane having parachute means openable by an airflow caused by the movement of the craft or by windflow relative thereto, whereby a large volume of air at relatively high velocity is instantly obtainable without taxing any resource of the craft itself.

A further object of the invention is to construct an aircraft such as an airplane wherein the relative airflow in any direction can be utilized to open the parachute means, so as to function as in a nose dive, or in a tail spin, or in a side slip or fall.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in front elevation showing an airplane with parachute means embodying the invention, and with certain parts omitted.

Fig. 2 is a vertical sectional view on the line 2—2 of Fig. 1.

Fig. 3 is an enlarged sectional view like that of Fig. 2, but with the parachute folded away out of use.

Figs. 4 and 5 are diagrammatic views showing the air deflector means in different respective positions during a tail spin and a side slip, upon failure of the airplane motor.

Fig. 6 is a sectional view of a modification.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include an aircraft such as an airplane 11 having a fuselage 12, a motor 13 from which the propeller has been omitted from the drawing, and one or more wings 14. If the motor stalls or becomes damaged, the pilot is helpless, although he may in some cases retain sufficient control to enable him to glide the plane to the earth. Even in that case, he may have no control over the landing point, and hence the plane may be destroyed on an obstacle on the ground. These difficulties apply especially to single motor airplanes, but may also occur in airplanes having two or more engines. The difficulties referred to may be wholly or partially eliminated by the use of any parachute means 15, which tend to slow up the plane, and may carry a substantial portion of the weight of the plane and its load in a manner sufficiently balanced to permit the pilot to maintain control by the use of the ailerons. Even if the plane should be compelled to land at an undesired place, its speed would be so low as to greatly diminish damage to the plane and injury to the occupants thereof.

Heretofore an important difficulty was presented by the need for housing the parachute so that it would not substantially decrease the flight efficiency of the plane, and yet permit the parachute to be instantly available for use, without obstruction by the housing structure. Another difficulty which I discovered was that the opening up of a large or huge parachute presented structural complications and features of uncertainty, so that the parachute would sometimes fail to open up and would often become entangled at its ropes. The means which I devised to overcome these drawbacks will now be described.

A section of the aircraft, preferably the wing 14 thereof, is formed with one or more compartments 16, which may open upwardly to receive the parachute 15. As shown in Fig. 2, the ropes 17 of the parachutes are connected to the bottom wall of the compartment 16, as at 18. The compartment 16 itself may be formed in any suitable manner, with the wing being otherwise hollow as may be desired, although in the drawing, the wing has been cross sectioned solid for clarity and simplicity.

When a parachute 15 is laid into the compartment 16, it is folded compactly thereinto in any suitable manner, preferably as shown in Fig. 3. The type of folding shown is characterized in that the central section 19 of the parachute is directly communicable with an air inlet opening 20 in the bottom of the wing to thus permit immediate inflation or expansion of this central section 19. More particularly, the section 19 has side portions 21 folded back and forth in superimposed relation under the top section 19, with the folds 21 spaced to leave therebetween a central passage 22. From the lowermost fold, the fabric extends upward at 23, and again a series of superimposed folds 24 are formed, the lowermost of which is connected to the ropes 17. The latter need not be shown in Fig. 3, but they are suitably compacted into the compartment 16.

The parachute 15 may be made of any suitable material which is sufficiently light and strong. Similarly, it may be seamed as desired to produce a compact and strong structure.

When the parachute 15 is folded away into the compartment 16 as shown in Fig. 3, the top opening of the compartment may be closed by a wall 25. The latter is preferably discardable since it need be used only once, when the plane is in serious distress or danger. Desirably the wall 24 is made of any suitable light weight material, which is snugly fitted into the chamber 16 and sealed thereto as by paint or the like. This preserves the important stream lined upper surface of the wing which produces most of the lifting power, and prevents any flow of air through the chamber 16. When inflation or expansion of the parachute is desired, the wall 25 may be removed in any suitable manner, as by a force breaking the paint or other seal referred to. For example, a rope 26 may be connected thereto at 27 so that the operator may pull off or break the closure 25.

Upon opening up the chamber 16, a pneumatic means causes a blast of air to flow into and expand the parachute outward of the chamber 16. Preferably I may provide a duct member 28 communicating with the opening 20 and connected to the bottom wall of the wing 14. Desirably the duct 28 opens in a lateral or generally horizontal direction and is mounted on a swivel bearing as at 29 to permit rotation thereof to thus take advantage of available air currents as hereinafter described. For rotating the duct 28, a flexible element or shaft 30 may be connected to the duct and may be manipulated by the operator and set in a desired position.

If the plane is traveling forward as shown, or if it is going into a nose dive, the duct 28 may be directed forward, toward the leading edge of the wing as shown. If the plane is going into a tail spin, the duct 28 may be directed rearwardly toward the tail end of the craft, as shown in Fig. 4. If the plane is side slipping or falling, the duct 28 may be directed toward the lower end of the wing as shown in Fig. 5. Thus the current of maximum velocity may be utilized to obtain an air stream of substantial force for opening up the parachute, through passage 22 to expand the center section 19, 20 and then to cause the rest of the parachute to expand, whereupon the parachute will readily leave its chamber 16 and assume the operative position.

The structure and arrangement of the duct 28 may be such as to offer substantially no obstruction from the streamlining point of view. It may lie quite flat and thin against the underside of the wing. When not in use, it may be directed rearward, so that its mouth shall offer no obstruction to air currents.

The intake efficiency of the duct 28 may be greatly increased by the adjacent face of the wing acting as a guide for the air currents flowing to the duct.

In Fig. 6 is shown a modification wherein the wing 31 is in all respects like that shown in Fig. 3, except that the duct 28 is removed and replaced by a vane or deflector plate 32 hingedly mounted at 33 and movable into a recess 34 in the underside of the wing to thus open and close the opening 35 leading to the chamber 16 of the parachute 15. The operation may be like that of the other structure, except that for diffreent directions, different corresponding deflectors 32 would be required.

It is thus seen that I have provided a device which fulfills the objects of the invention and is well adapted for practical use.

I claim:

1. A device including an airplane having wings streamlined for upper suction surfaces and lower pressure surfaces, a parachute normally housed in a portion of the airplane and connected thereto for upward expansion to thus impart a lifting power to the airplane, an angle shaped open ended air duct cooperating with the airplane and the parachute for directing a stream of air into the parachute to expand the latter at will, means for mounting the air duct on the wing so that the air duct is rotatable about an axis substantially at right angles to said pressure surfaces and one arm extends approximately parallel to the pressure surfaces, and lies wholly within the area of the pressure surfaces and in such close proximity thereto as to cause a flow of air into the duct which shall be a maximum due to the velocity of the airplane and the pressure caused by said pressure surfaces in different positions of the airplane, and means for rotating the air duct to a desired direction according as an air stream may be required therein, whereby a duct of minimum size and affording relatively little air resistance under normal conditions can be rotated according to the position of falling of the airplane to cause a strong flow of air into the parachute for rapidly expanding the same.

2. A device including an airplane having wings streamlined so as to provide a leading longitudinal edge and a lower pressure surface extending thereto, a parachute normally housed in a top portion of the airplane and connected thereto for upward expansion to thus impart a lifting power to the airplane, an airduct cooperating with the parachute and the airplane for directing a stream of air into the parachute to expand the latter at will, said airduct having the mouth thereof facing toward the leading edge and lying closely adjacent to said pressure surface and wholly within the area thereof so that the said mouth lies directly in the air pressure region caused by said surface.

NICHOLAS VALLINOS.